United States Patent
McCasland et al.

(10) Patent No.: US 6,416,675 B1
(45) Date of Patent: Jul. 9, 2002

(54) SEPARATING MATERIALS HAVING DIFFERENT SPECIFIC GRAVITIES

(76) Inventors: Edwin D. McCasland, P.O. Box 4113; Michael McCasland, 1546 N. Harrison, both of Pocatello, ID (US) 83205

(*) Notice: Subject to any disclaimer, the term of this patent is extended or adjusted under 35 U.S.C. 154(b) by 0 days.

(21) Appl. No.: 09/664,634

(22) Filed: Sep. 19, 2000

(51) Int. Cl.⁷ ............................................ B01D 17/06
(52) U.S. Cl. ............... 210/748; 210/787; 210/800; 210/519; 210/521; 210/532.1; 210/533; 210/537; 210/538; 210/540
(58) Field of Search ................ 210/748, 787, 210/800, 519, 521, 532.1, 533, 537, 538, 540

(56) References Cited

U.S. PATENT DOCUMENTS

| | | | |
|---|---|---|---|
| 1,147,881 A | 7/1915 | Morris | 210/540 |
| 1,278,326 A | 10/1918 | Kutzer | 210/538 |
| 1,672,583 A | 6/1928 | Travers | 210/801 |
| 2,058,044 A | 10/1936 | Spencer | 210/538 |
| 2,304,248 A | 12/1942 | Entwistle et al. | 210/519 |
| 2,355,305 A | 8/1944 | Koenig | 210/519 |
| 4,064,054 A | 12/1977 | Anderson et al. | 210/536 |
| 4,123,365 A | 10/1978 | Middelbeek | 210/521 |
| 4,132,652 A | 1/1979 | Anderson et al. | 210/536 |
| 4,146,468 A * | 3/1979 | Wilson | |
| 4,213,865 A | 7/1980 | Wagner | 210/522 |
| 4,278,545 A | 7/1981 | Batutis et al. | 210/521 |
| 4,305,825 A * | 12/1981 | Laval, Jr. | |
| 5,204,000 A | 4/1993 | Steadman et al. | 210/519 |
| 5,861,098 A * | 1/1999 | Morrison | |
| 6,036,027 A * | 3/2000 | Grimes | |

* cited by examiner

Primary Examiner—Betsey Morrison Hoey
(74) Attorney, Agent, or Firm—Ormiston & McKinney, PLLC (57) ABSTRACT

A separator that utilizes an arcuate inlet manifold and an arcuate baffle to increase the rate of separation for a mix of materials having different specific gravities. The separator includes an arcuate baffle that defines a separation chamber and an arcuate pipe through which a mixture of materials having specific gravities is carried into the chamber. The mixture is discharged into the separation chamber against the baffle through a series of openings disposed along the perimeter of the pipe. The baffle, pipe and openings are configured relative to one another such that mixture is discharged against the baffle at an oblique angle. In preferred versions of the invention, mixture is discharged slanting up, slanting to the side or slanting up and to the side against the baffle at an angle of 18 to 24 (most preferably at about 22°).

32 Claims, 9 Drawing Sheets

SEPARATING MATERIALS HAVING DIFFERENT SPECIFIC GRAVITIES

FIELD OF THE INVENTION

The invention relates to the separation of oil and water or other mixes of materials having different specific gravities.

BACKGROUND

The efficient and cost effective treatment of water contaminated with oil-based materials or other mixes of materials having different specific gravities presents wellknown and long-standing problems. Oil, gasoline, antifreeze and the like naturally separate from water under the effects of gravity and accumulate on the surface of the water where it can easily be removed. This natural separation process is too slow to accommodate the treatment of large volumes of contaminated water unless very large settling tanks or ponds are used. The costs attendant to such large scale settling tanks make them impractical for use in most applications.

Many different systems have been devised to clean water by removing and retaining oil, thereby allowing the relatively clean water to be discharged in an environmentally safe manner. Most oil-water separators attempt to enhance or increase the rate at which oil naturally separates from water and collects on the surface of the water. Many of these oil-water separators are complex, expensive to construct and not well suited for use in varying applications and locations.

In an effort to fill the need for a gravity based oil-water separator that is comparatively inexpensive to construct and operate but still effective in treating relatively large volumes of contaminated water, I developed the techniques described in U.S. Pat. No. 5,637,234. The '234 patent describes methods and apparatus for separating an incoming mix of oil and water (or a mix of other materials having different specific gravities) into multiple streams and discharging those streams against a baffle plate to increase the rate at which the lighter oil separates from the heavier water. The present invention was developed in an effort to improve on the techniques described in the '234 patent.

SUMMARY

The present invention is directed to a separator that utilizes an arcuate inlet manifold and an arcuate baffle to increase the rate of separation for a mix of materials having different specific gravities. In one embodiment, the separator includes an arcuate baffle that defines a separation chamber and an arcuate pipe through which a mixture of materials having specific gravities is carried into the chamber. The mixture is discharged into the separation chamber against the baffle through a series of openings disposed along the perimeter of the pipe. The baffle, pipe and openings are configured relative to one another such that mixture is discharged against the baffle at an oblique angle. In preferred versions of this embodiment, mixture is discharged slanting up, slanting to the side or slanting up and to the side against the baffle at an angle of 18° to 24° (most preferably at about 22°).

The invention may also be embodied in a method for separating materials having different specific gravities. In one embodiment, the method includes providing a cylindrical chamber, circulating a mixture of materials having different specific gravities around the chamber, removing lighter material from the top of the circulating mixture, and removing heavier material from the bottom of the circulating mixture. In another embodiment, the method includes discharging multiple streams of a mixture of materials having different specific gravities against a vertically oriented cylindrical baffle at an angle of 18° to 24° above horizontal and at an angle of 18° to 24° relative to a tangent line for the curve of baffle.

In another embodiment, the invention includes an ultrasonic transducer used in combination with the apparatus described above to treat waste slurries or other mixes containing solids. Exposing the incoming mixture to ultrasonic vibration breaks loose any particles that may have bonded to the oil, for example, in an oil and water mix.

The foregoing summary is not intended to be an inclusive list of all aspects and features of the invention nor should any limitation on the scope of the invention be implied from this summary. The summary is provided in accordance with the requirements of 37 C.F.R. § 1.73 and the Manual of Patent Examining Procedure (MPEP) 608.01 (d) merely to apprise the public of the nature of the invention.

DETAILED DESCRIPTION

Although the invention may be used to separate mixes of many different materials having different specific gravities, it will often be used to separate oil and water. Therefore, for convenience, the following description relates to oil and water mixes. The lighter material is oil and the heavier material is water.

Figure 1:
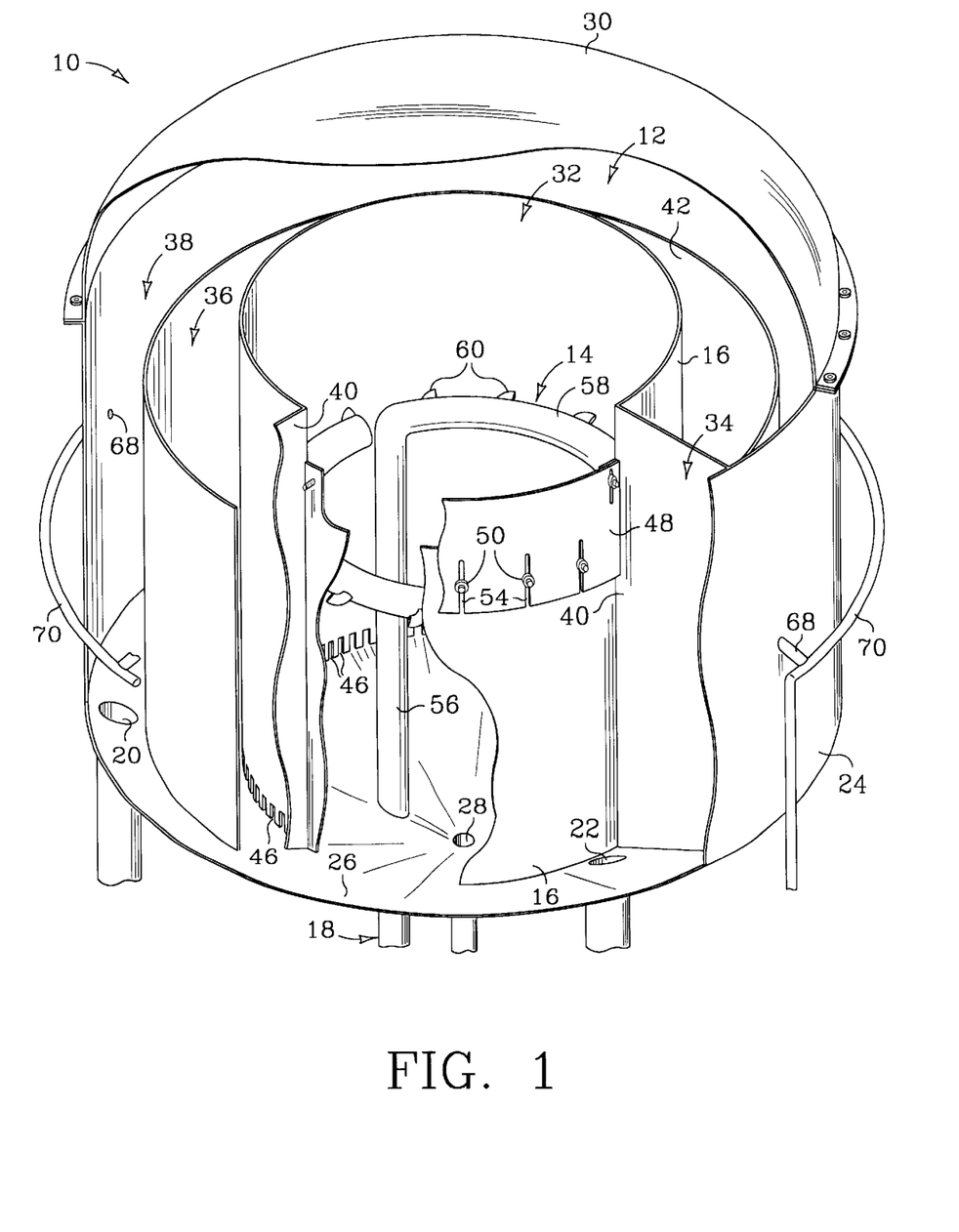
FIG. 1 is a perspective partial cut-away view of a separator constructed according to one embodiment of the invention in which the incoming mixture is separated into multiple streams and discharged into the separator vessel through a series of ports disposed around the circumference of a ring shaped inlet pipe.
Figure 2:
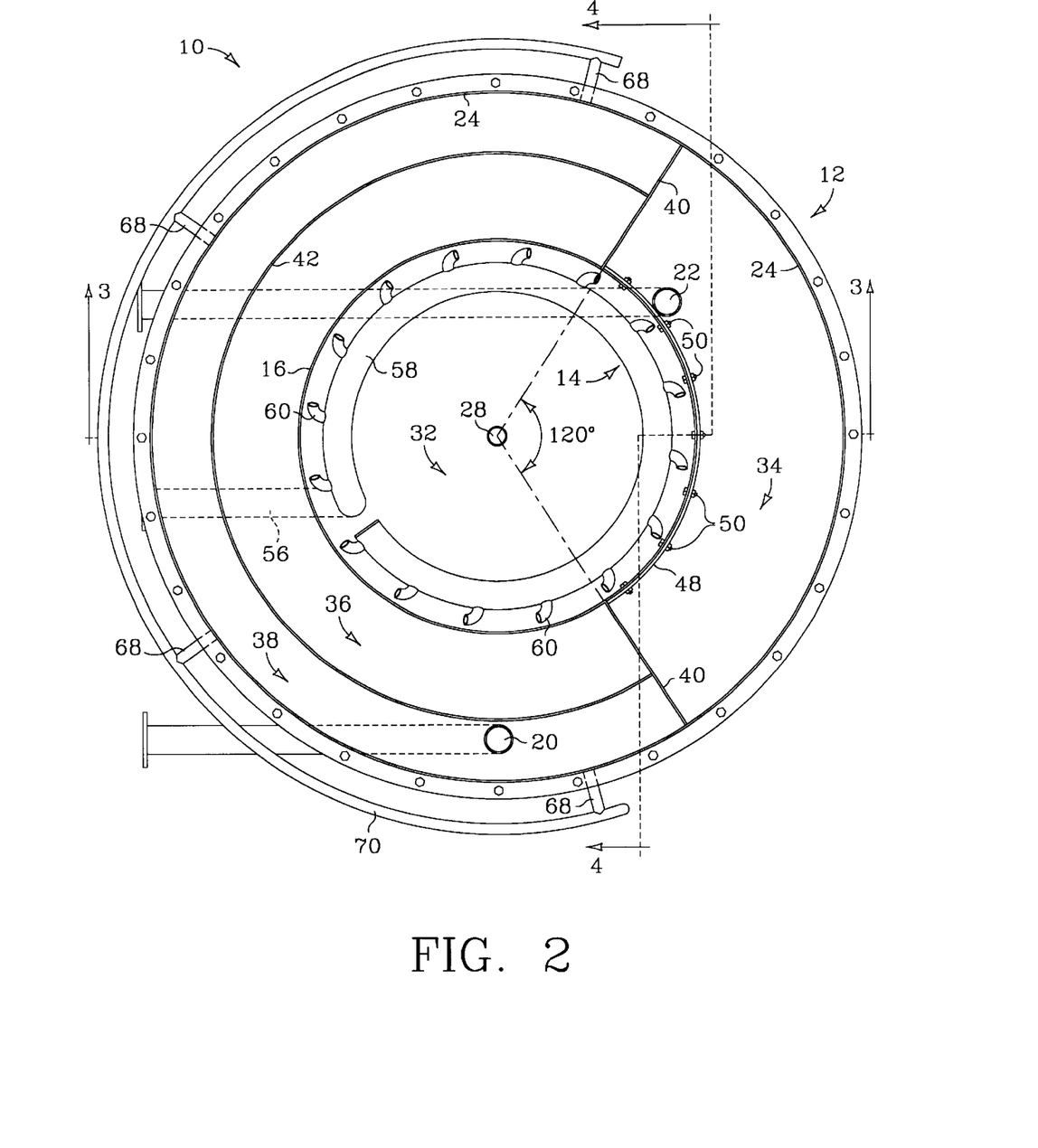
FIG. 2 is a plan view section looking down into the separator of FIG. 1.
Figure 3:
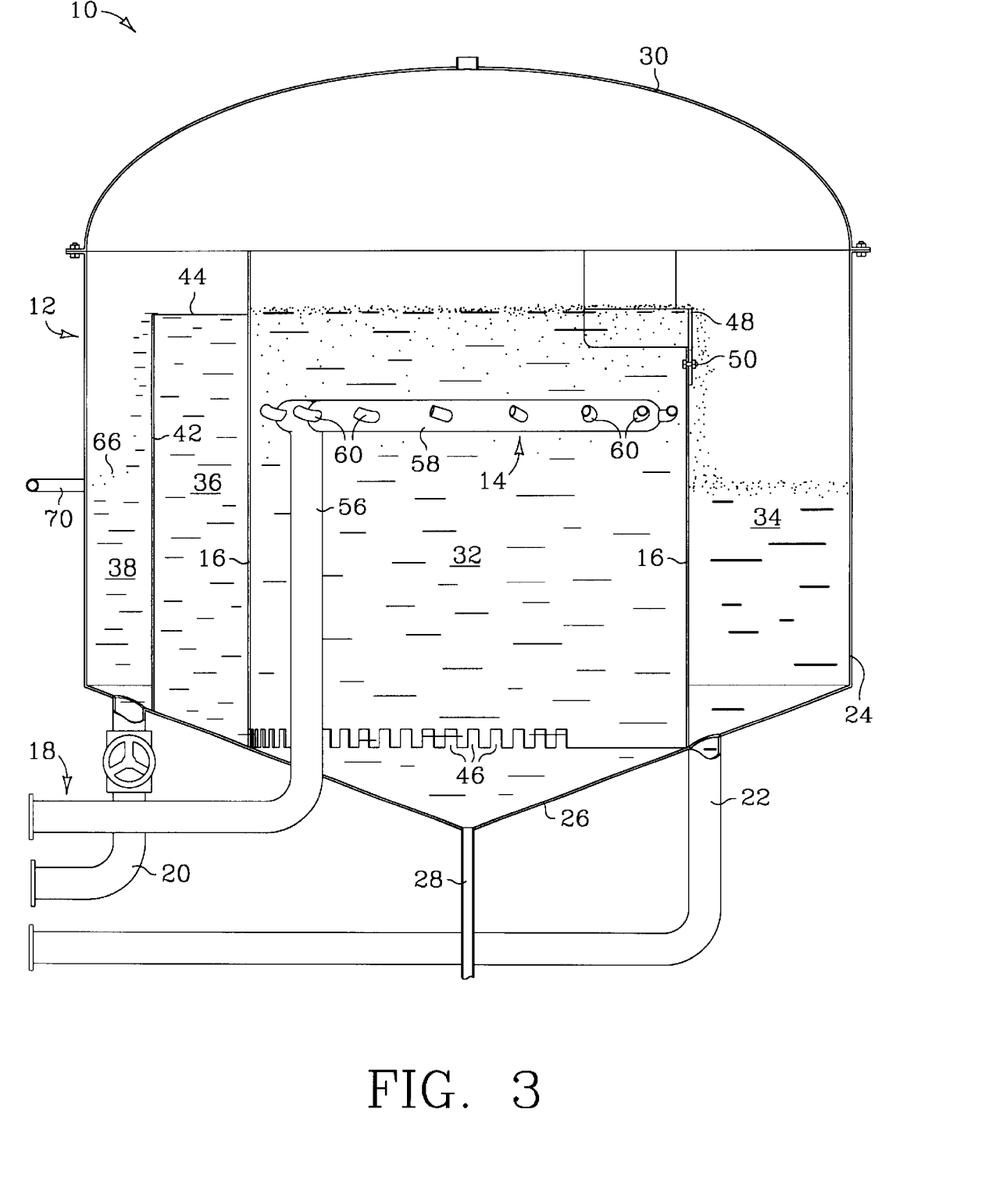
FIG. 3 is an elevation view section of the separator of FIG. 1 taken along the line 3—3 in FIG. 2.
Figure 4:
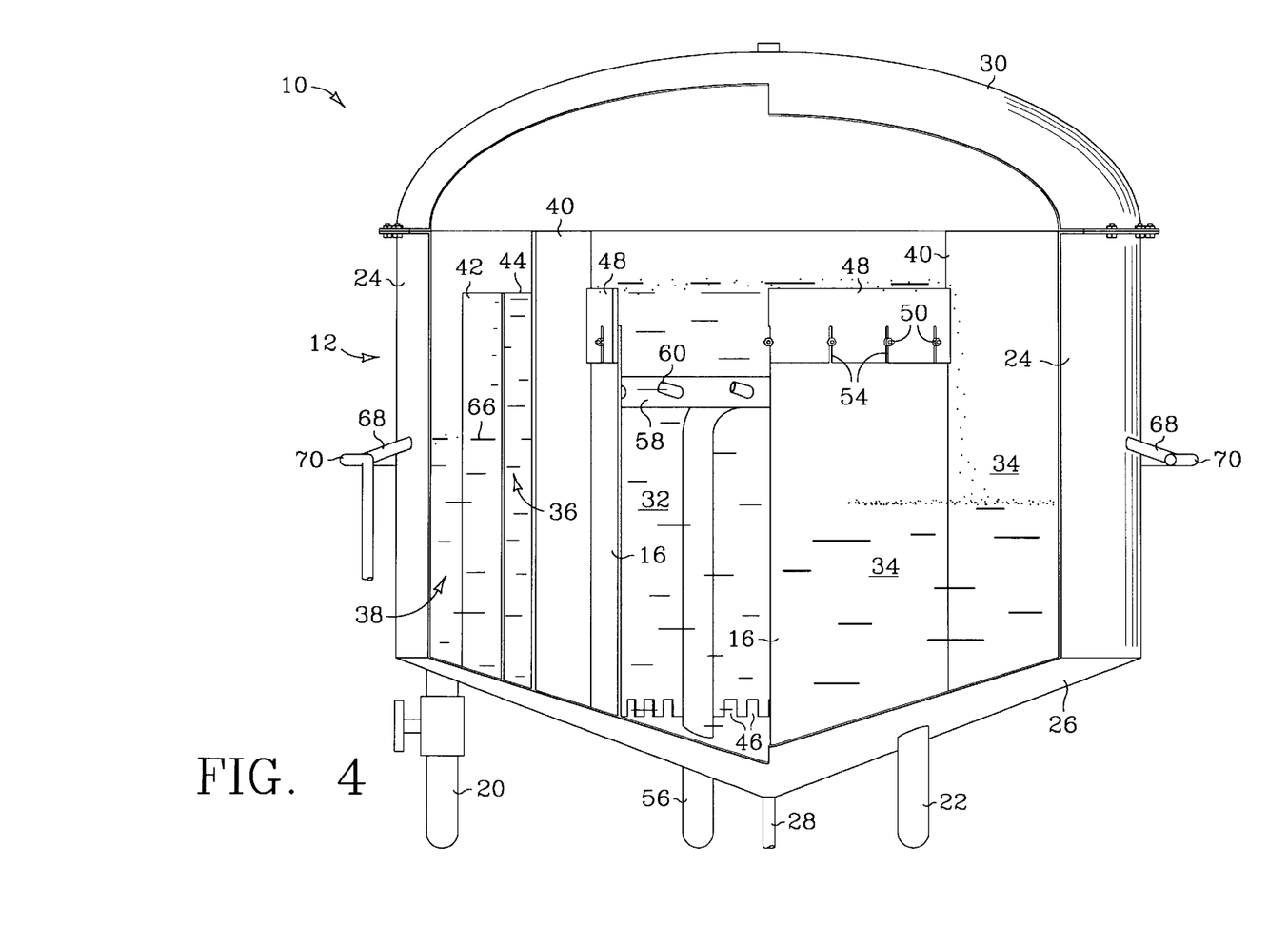
FIG. 4 is an elevation view section of the separator of FIG. 1 taken along the fine 4—4 in FIG. 2.

FIG. 1 is a perspective view of a separator constructed according to one embodiment of the invention in which the incoming mixture is separated into multiple streams and discharged into the separator vessel through a series of ports disposed around the circumference of a ring shaped inlet pipe. The separator is designated generally by reference number 10 in the figures. FIG. 2 is a plan view section looking down into separator 10. FIG. 3 is an elevation view section of separator 10 taken along the line 3—3 in FIG. 2. FIG. 4 is an elevation view section of separator 10 taken along the line 4—4 in FIG. 2.

Referring to FIGS. 1–4, separator 10 includes a vessel 12, a inlet manifold 14 and an arcuate baffle 16 surrounding inlet manifold 14. The oil and water mix is delivered to inlet manifold 14 through an inlet 18. Water is removed from vessel 12 through a first outlet 20. Oil is removed from vessel 12 through a second outlet 22. Vessel 12 consists of a cylindrical body 24 and a conical bottom section 26. A third outlet 28 at the bottom of conical section 26 may be used for sludge removal, as a clean out, or to drain vessel 12. Vessel 12 may be fully enclosed with a cover 30.

Vessel 12 includes four working chambers—a separation chamber 32, an oil catch basin 34, control chamber 36, and water overflow and catch basin 38. The primary separation chamber 32 occupies the center of vessel 12 and is defined generally by baffle 16. In the embodiments shown in the figures, baffle 16 is a circular cylinder that extends to the bottom of vessel 12. Other suitable configurations of baffle 16 are, however, possible. As described in more detail below, the incoming oil and water mix is discharged against baffle 16 to create a swirling motion within chamber 32. The primary function of baffle 16 is to block and redirect the flow of mix. Hence, baffle 16 need not extend all the way to the bottom of vessel 12 nor is a circular or full cylinder necessarily required. It may be sufficient for some operating conditions to construct baffle 16 as an arcuate shell that extends only part of the way around and extends to just below inlet manifold 14.

Oil catch basin 34 is a truncated ring shaped chamber lying between the outside of baffle 16 and the inside of body 24 of vessel 12. Oil catch basin 34 is the area bordered by baffle 16, vessel body 24 and the inside of a pair of divider plates 40 that extend radially between baffle 16 and vessel body 24. As best seen in FIG. 2, oil catch basin 34 occupies about ⅓ of the area between baffle 16 and vessel body 24. The remainder of the ring shaped area between baffle 16 and vessel body 24 is occupied by control chamber 36 and water catch basin 38. Control chamber 36 is the area bordered by the outside of baffle 16, the inside of control plate 42 and the outside of divider plates 40. Control plate 42 is truncated cylindrical plate that extends from the bottom of vessel 12 up to the desired water level 44 in vessel 12. The bottom of control plate 42 is sealed to the bottom of vessel 12. The height of control plate 42 controls the water level 44 in vessel 12. Water catch basin 38 is the area border by the outside of control plate 42, the inside of vessel body 24 and the outside of divider plates 40.

The bottom of divider plates 40 and that portion of the bottom of baffle 16 that borders oil catch basin 34 are sealed to the bottom of vessel 12. Openings 46 are formed in that portion of the bottom of baffle 16 that borders control chamber 36 so that water can flow out the bottom of separation chamber 32 into control chamber 36. The size, shape and location of openings 46 are not critical except that openings 46 must have sufficient capacity to allow water to flow into control chamber 36 at least as fast as water is entering vessel 12 as part of the oil and water mix.

That portion of the top of baffle 16 that borders oil catch basin 34 is slightly higher than water level 44 to block the flow of water into catch basin 34 while allowing oil accumulating on the top of the water to spill over baffle 16 into basin 34. That portion of the top of baffle 16 that borders control chamber 36 is made high enough to block the flow of oil and water.

In the embodiment of the invention shown in the figures, the top of baffle 16 bordering oil catch basin 34 is constructed as an adjustable height weir 48. The height of weir 48 is set to block the flow of water into oil catch basin 34 while allowing oil accumulating on the top of the water to spill over weir 48 into basin 34. Weir 48 is secured to the top of baffle 16, for example, with a series of fasteners 50. A corresponding series of slots 54 in weir 48 allows weir 48 to slide up and down on fasteners 50 and thereby adjust to the desired height. Oil outlet 22 is located at the bottom of oil catch basin 34. Oil flows into catch basin 34 over weir 48 and out of catch basin 34 through outlet 22. The size of outlet 22 (gravity drain) or the capacity of outlet 22 (pumping system) is not critical except that outlet 22 must have sufficient capacity to remove oil from vessel 12 at least as fast as oil is entering vessel 12 as part of the oil and water mix.

Water catch basin 38 is the area bordered by the outside of control plate 42, the inside of vessel body 24 and the outside of divider plates 40. Water outlet 20 is located at the bottom of water catch basin 38. Water flows into catch basin 38 over control plate 42 and out of catch basin 38 through outlet 20. The size of outlet 20 (gravity drain) or the capacity of outlet 20 (pumping system) is not critical except that outlet 20 must have sufficient capacity to remove water from vessel 12 at least as fast as water is entering vessel 12 as part of the oil and water mix.

Figure 5:
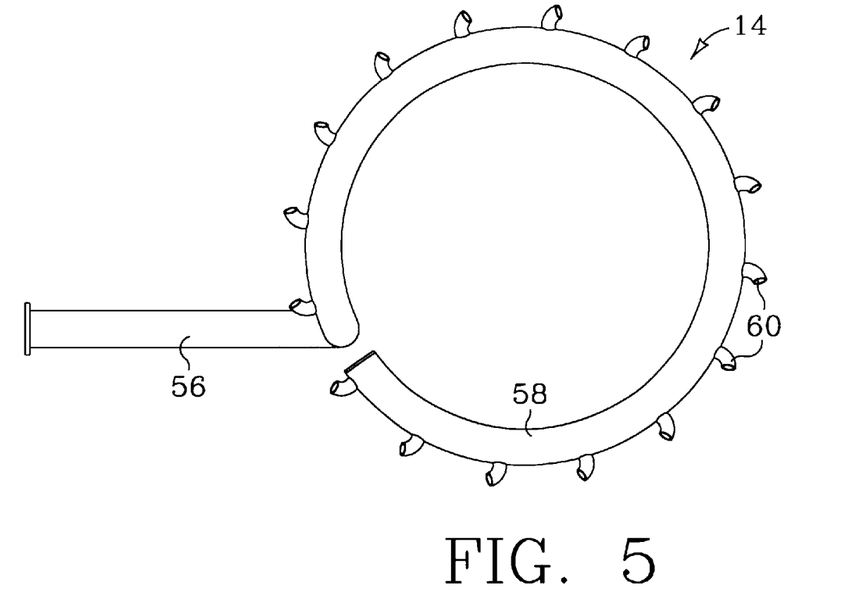
FIGS. 5 and 6 are detail plan and elevation views of the port ring used in the separator of FIG. 1.
Figure 6:
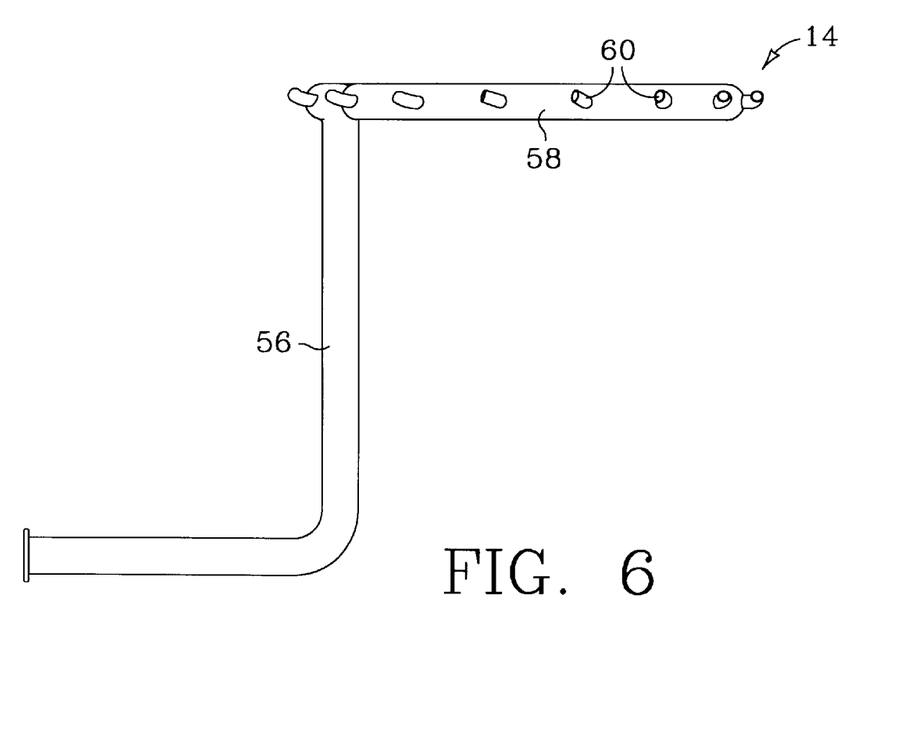

An inlet mechanism (not shown) delivers the oil and water mix to vessel 12 via feed pipe 56 and inlet manifold 14. The inlet mechanism may be any conventional system for delivering the oil and water mix from its source or from storage to vessel 12, such as pumping or gravity feed systems. In the embodiments shown in the figures, inlet manifold 14 is a ring shaped pipe 58 oriented horizontally in separation chamber 32. The curve of pipe 58 corresponds to the curve of baffle 16. For example, if baffle 16 is circular, then pipe 58 is also circular. Inlet manifold 14 is located 12" to 36" below water level 44. Inlet manifold 14 is shown in more detail in FIGS. 5 and 6. Referring now to all of FIGS. 1–6, a series of discharge ports 60 are spaced around the outside perimeter of pipe 58. One end of pipe 58 is connected to the inlet mechanism through feed pipe 56. The other end of pipe 58 is blocked or capped so that the oil water mix is discharged into separation chamber 32 through ports 60. The oil and water mix is separated into multiple streams and discharged against baffle 16 through ports 60. The discharge end of each port 60 is located 1" to 3" from baffle 16.

Figure 7:
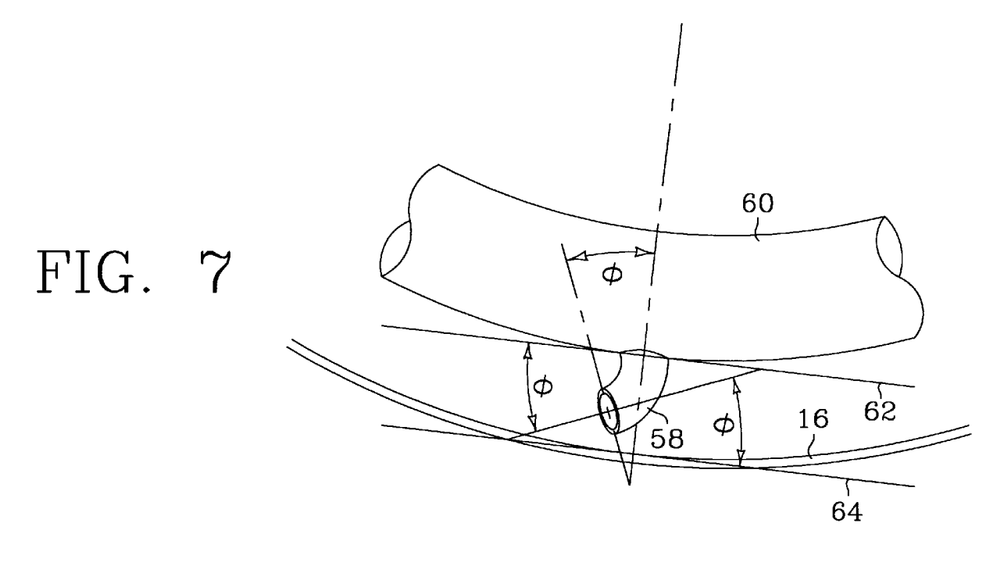
FIGS. 7 and 8 are detail plan and elevation views of one exemplary embodiment of the discharge ports.
Figure 8:
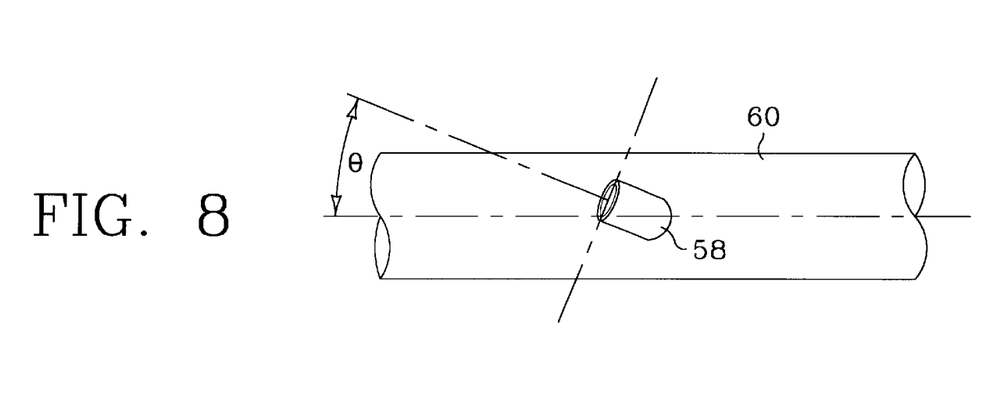

Referring now also to FIGS. 5–8, ports 60 are oriented at an angle θ that is 18° to 24° above horizontal as shown in FIG. 8. Ports 60 are thus oriented so that the multiple streams of oil and water mix are discharged from manifold 14 toward baffle 16 slanting up 18° to 24°. Experimentation indicates the oil and water separate most rapidly when the discharge angle θ is approximately 22°. It is also desirable to orient ports 60 such that the multiple streams of oil and water mix are discharged from manifold 14 toward baffle 16 slanting to the side 18° to 24°. Thus, and as best seen in FIG. 7, ports 60 are oriented at a second discharge angle φ that is 18° to 24° out from a tangent line 62 for the curve of pipe 58 (which is 18° to 24° in from a tangent line 64 for the curve of baffle 16). Experimentation indicates the oil and water separate most rapidly when the discharge angle φ is also approximately 22°. In a preferred embodiment, the mixture is discharged from ports 60 at a pressure in the range of 3 psi to 10 psi, most preferably about 5 psi.

In operation, the oil and water mix is delivered into separation chamber 32 via feed pipe 56 and inlet manifold 14. The mix is separated into multiple streams and discharged through ports 60 at dual oblique angles θ and φ, both of which range from 18° to 24°, preferably 22°. That is to say, the mix is discharged slanting up and to the side toward baffle 16. Gravity naturally causes the water to sink and the oil to rise. The configuration and location of inlet manifold 14 and baffle 16 makes the oil and water mix swirl around chamber 32 in an upward spiraling vortex that helps increase the rate at which the oil and water would otherwise separate. As the oil separates from the water, the oil rises and collects on the surface of the water, spills over weir 48 into oil catch basin 34 and is removed from vessel 12 through outlet 22. Water flows under pressure from its own weight under baffle 16 through openings 46 into control chamber 36, over control plate 42 and into water catch basin 38. Water is removed from basin 38 through outlet 20.

In the embodiment shown in the figures, separator 10 also includes piping to remove any oil residue that may form on the surface 66 of the water in catch basin 38. Referring to FIGS. 2–4, fluid is drained or pumped off surface 66 in water catch basin 38 through a series of pipes 68 positioned around catch basin 38. The fluid collects in pipe 70 for disposal or recirculation to separation chamber 32.

Figure 9:
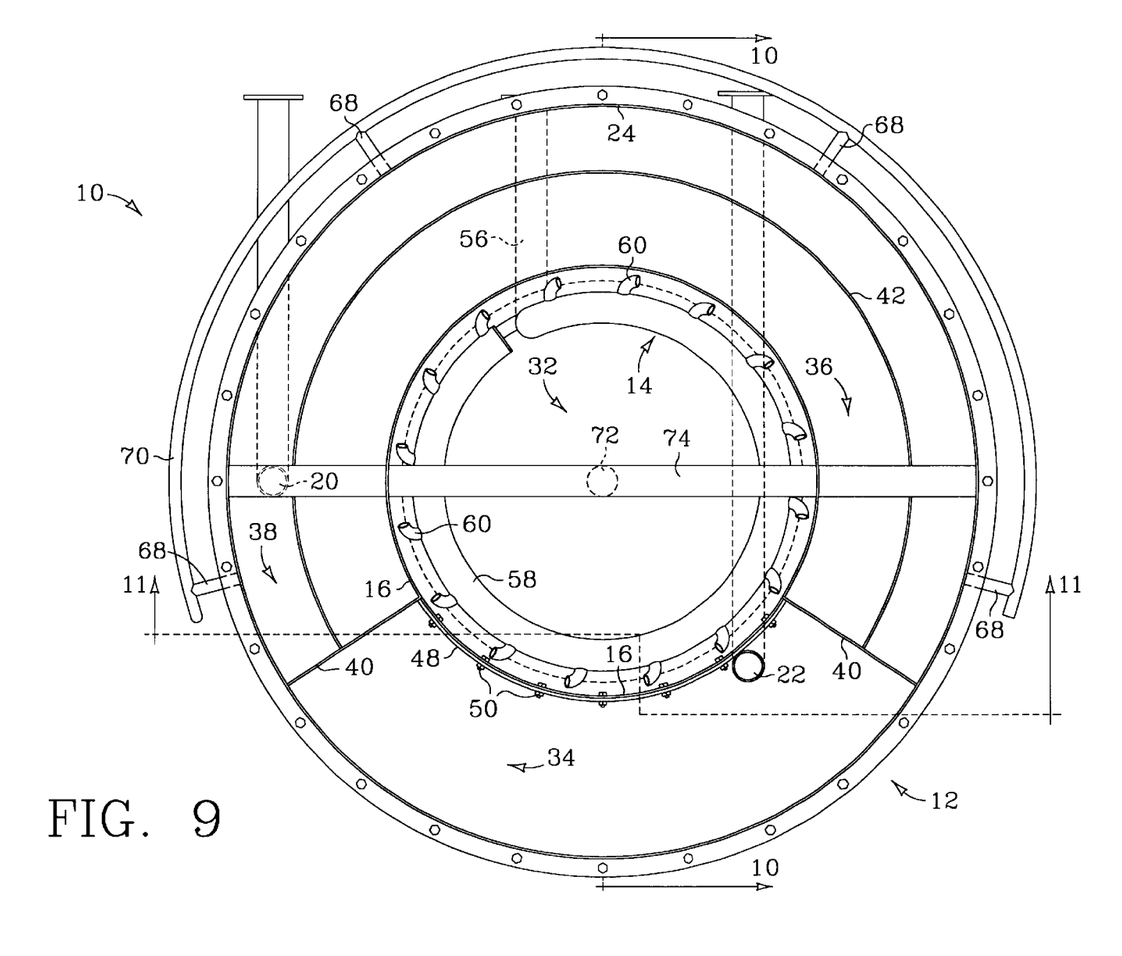
FIG. 9 is a plan view section of a separator constructed according to a second embodiment of the invention in which the incoming materials are exposed to ultrasonic vibration.
Figure 10:
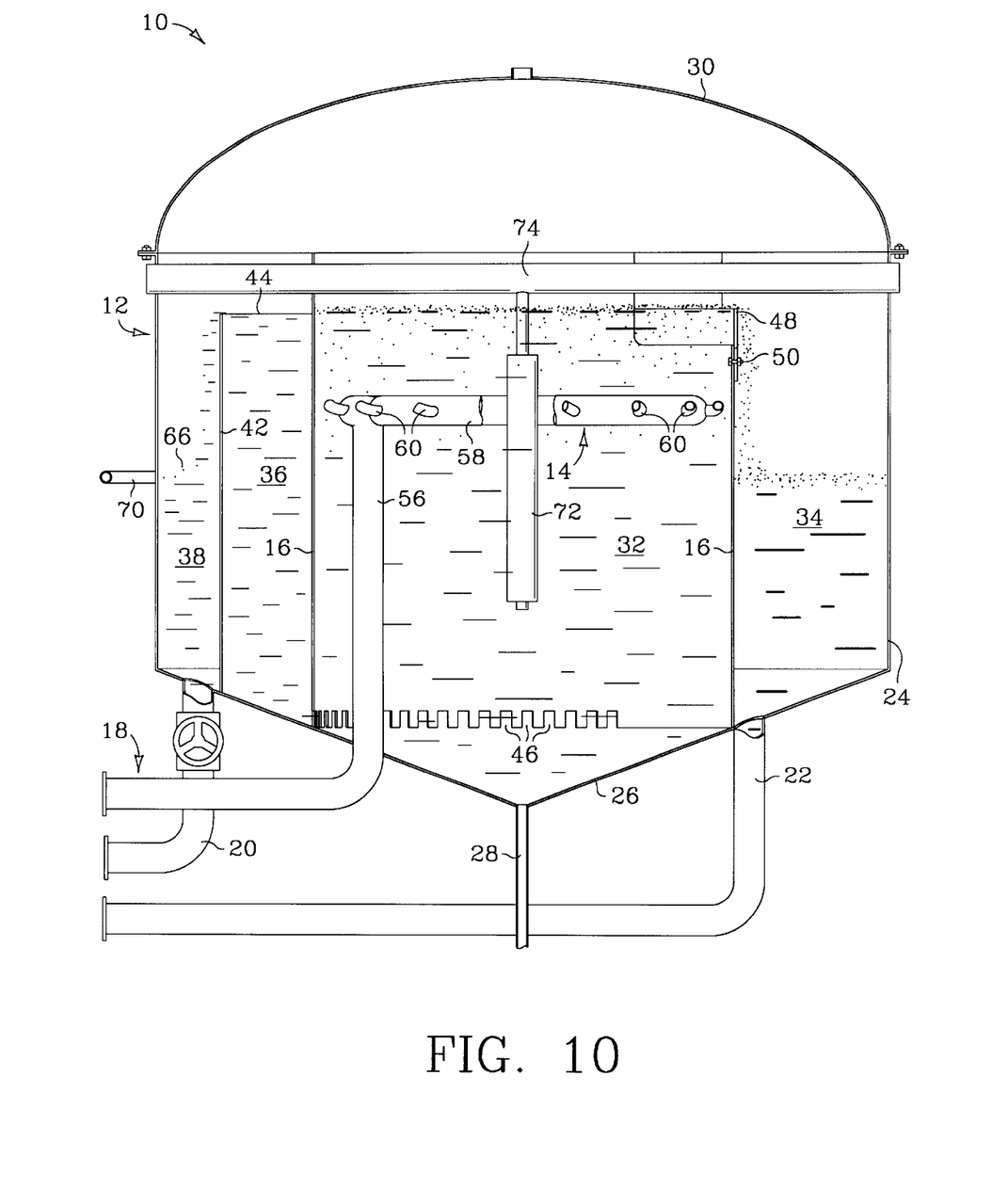
FIG. 10 is an elevation view section of the separator of FIG. 9 taken along the line 10—10 in FIG. 9.
Figure 11:
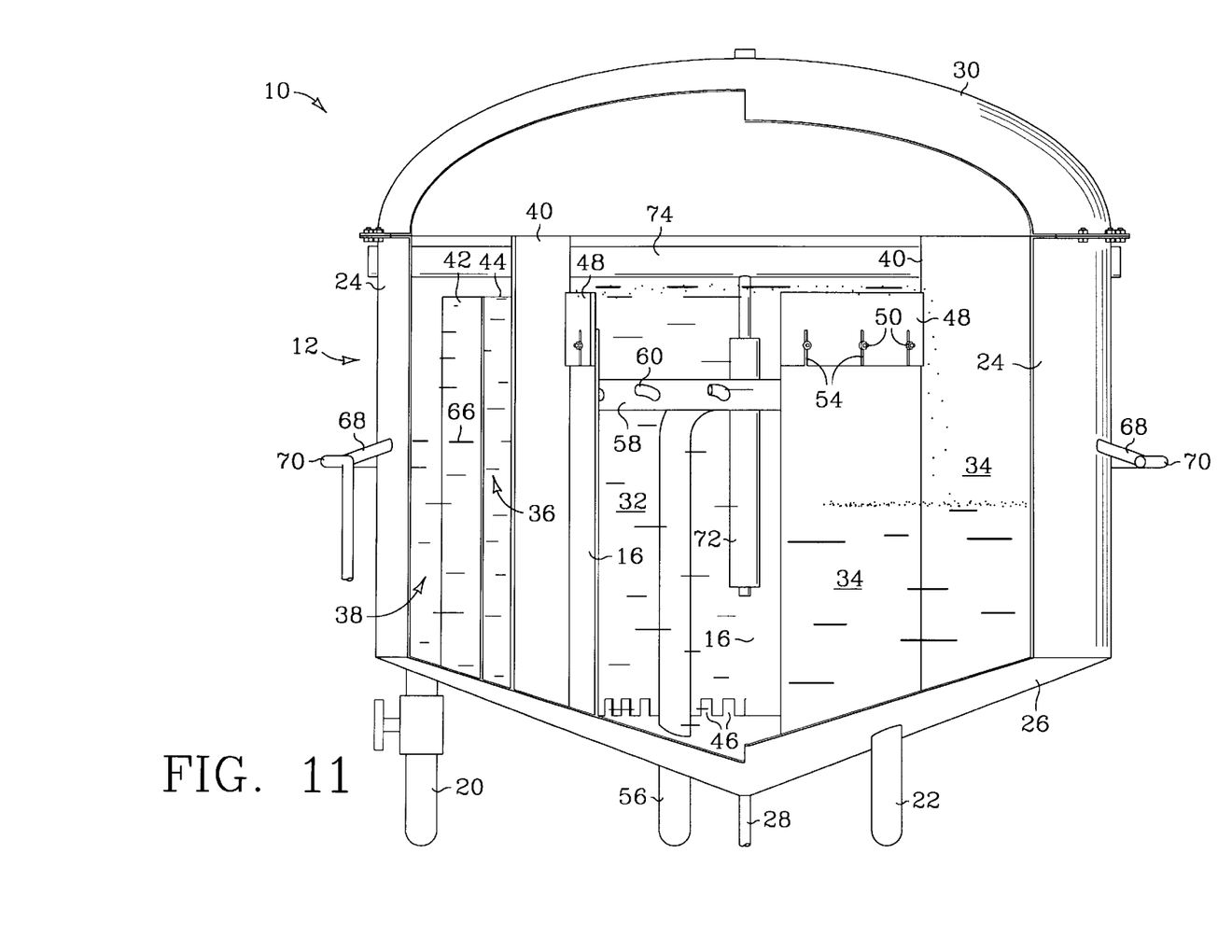
FIG. 11 is an elevation view section of the separator of FIG. 9 taken along the line 11—11 in FIG. 9.

In a second embodiment of the invention shown in FIGS. 9–11, an ultrasonic transducer 72 is used to break loose any particles that may have bonded to the oil in the oil and water mix. For example, wastewater contaminated with oil will sometimes contain sand or other particulate debri that clings to the oil. Also, separator 10 may be used to re-claim oil that is embedded in or mixed with sand or some other solid material base—the base material is pulverized, if necessary, mixed with water and then delivered to separator 10 where the oil is separated from any other materials in the mix.

Transducer 72 is suspended at the center of separation chamber 32 from just below the water level 44 to as far down as necessary or desirable to free as much oil as possible from any particles in the mix. Transducer 72 is suspended from a pipe 74 or other suitable support. Pipe 74 is supported on each end by the body 24 of vessel 12. As the mix of material is discharged into and swirls around separation chamber 32 near transducer 72, sonic vibrations in the mix break the bonds between the oil and the particles so the oil can rise to the surface. Preferably, ultrasonic transducer 72 extends well below inlet manifold 14 so that particles are continuously exposed to the sonic vibrations as they settle to the bottom of chamber 32. Although the type and specific operating parameters for transducer 72 will vary depending on the material mix being processed, the desired degree of separation and the size of the vessel, it is expected that a comparatively high power (e.g., 1500 watts–3,000 watts) transducer operating at frequencies of 15 KHz to 40 KHz will be sufficient to achieve an acceptable degree of separation.

The physical components of separator 10 can be made of any material such as steel, plastic or fiberglass that are not subject to corrosion or other deterioration when exposed to oil or other contaminants found in the mix. One example of a production scale separator 10 that can treat approximately 200 gallons per minute of an oil and water mix was constructed as follows (all heights are measured from the bottom of vessel body 24): vessel body 24—48" high×84" inside diameter; baffle 16—48" high (around control chamber 36)×42" inside diameter; control plate 42—46" high× 48" inside diameter; port ring pipe 58—3" diameter pipe× 39" diameter ring (measured to the center of the pipe); 16 discharge ports 60—1" diameter 90° pipe elbows spaced apart 22.5° around port ring 58. Port ring 58 was positioned 12"–36" below water level 44. The end of each discharge port 60 was 1"–3" from baffle 16.

Although the invention has been shown and described with reference to the foregoing exemplary embodiments, other embodiments of the invention are possible. It is to be understood, therefore, that these and other embodiments may be made without departing from the spirit and scope of the invention, which is defined in the following claims.

What is claimed is:

1. An apparatus for separating materials having different specific gravities, comprising:

an arcuate baffle defining a chamber bounded at least partially by an inside perimeter of the baffle;

an arcuate pipe through which a mixture of materials having different specific gravities is carried into the chamber, the pipe having an outside perimeter corresponding generally to the inside perimeter of the baffle;

a plurality of openings disposed about the outside perimeter of the pipe through which mixture is discharged into the chamber;

the baffle, pipe and openings configured relative to one another such that mixture discharged from the openings is discharged against the baffle at an oblique angle;

an inlet through which mixture is delivered to the pipe;

a first outlet through which heavier material is removed from the chamber; and a second outlet through which lighter material is removed from the chamber.

2. The apparatus of claim 1, wherein the baffle, pipe and openings are configured such that mixture discharged from the openings is discharged slanting up against the baffle.

3. The apparatus of claim 2, wherein the baffle, pipe and openings are configured such that mixture discharged from the openings is discharged slanting up against the baffle at an angle of 18° to 24°.

4. The apparatus of claim 3, wherein the baffle, pipe and openings are configured such that mixture discharged from the openings is discharged slanting up against the baffle at an angle of approximately 22°.

5. The apparatus of claim 1, wherein the baffle, pipe and openings are configured such that mixture discharged from the openings is discharged slanting to the side against the baffle.

6. The apparatus of claim 5, wherein the baffle, pipe and openings are configured such that mixture discharged from the openings is discharged slanting to the side against the baffle at an angle of 18° to 24°.

7. The apparatus of claim 6, wherein the baffle, pipe and openings are configured such that mixture discharged from the openings is discharged slanting to the side against the baffle at an angle of approximately 22°.

8. The apparatus of claim 1, wherein the baffle, pipe and openings are configured such that mixture discharged from the openings is discharged slanting up and to the side against the baffle.

9. The apparatus of claim 8, wherein the baffle, pipe and openings are configured such that mixture discharged from the openings is discharged slanting up against the baffle at an angle of 18° to 24° and to the side against the baffle at an angle of 18° to 24°.

10. The apparatus of claim 9, wherein the baffle, pipe and openings are configured such that mixture discharged from the openings is discharged slanting up against the baffle at an angle of approximately 22° and to the side against the baffle at an angle of approximately 22°.

11. The apparatus of claim 1, wherein the inside perimeter of the baffle and the outside perimeter of the pipe are circular.

12. The apparatus of claim 1, further comprising an ultrasonic transducer disposed within the chamber such that mixture discharged from the openings is exposed to sonic vibrations generated by the transducer.

13. An apparatus for separating materials having different specific gravities, comprising:
   a vessel;
   a circular baffle oriented substantially vertical inside the vessel;
   a circular pipe through which a mixture of materials having different specific gravities is carried into the vessel, the pipe oriented substantially horizontal within an inside perimeter of the baffle; and
   a plurality of openings disposed about the outside perimeter of the pipe through which mixture is discharged into the vessel, the openings configured such that mixture discharged from the openings is discharged against the baffle at an oblique angle;
   an inlet through which mixture is delivered to the pipe;
   a first outlet through which heavier material is removed from the vessel; and
   a second outlet through which lighter material is removed from the vessel.

14. The apparatus of claim 13, wherein the openings are configured such that mixture discharged from the openings is discharged slanting up against the baffle.

15. The apparatus of claim 13, wherein the openings are configured such that mixture discharged from the openings is discharged slanting up against the baffle at an angle of 18° to 24°.

16. The apparatus of claim 15, wherein the openings are configured such that mixture discharged from the openings is discharged slanting up against the baffle at an angle of approximately 22°.

17. The apparatus of claim 13, wherein the openings are configured such that mixture discharged from the openings is discharged slanting to the side against the baffle.

18. The apparatus of claim 17, wherein the openings are configured such that mixture discharged from the openings is discharged slanting to the side against the baffle at an angle of 18° to 24°.

19. The apparatus of claim 18, wherein the openings are configured such that mixture discharged from the openings is discharged slanting to the side against the baffle at an angle of approximately 22°.

20. The apparatus of claim 13, wherein the openings are configured such that mixture discharged from the openings is discharged slanting up and to the side against the baffle.

21. The apparatus of claim 20, wherein the openings are configured such that mixture discharged from the openings is discharged slanting up and to the side against the baffle at an angle of 18° to 24°.

22. The apparatus of claim 21, wherein the openings are configured such that mixture discharged from the openings is discharged slanting up and to the side against the baffle at an angle of approximately 22°.

23. An apparatus for separating materials having different specific gravities, comprising:
   a vertically oriented cylindrical panel having an inside perimeter defining a first chamber;
   a second chamber in fluid communication with the first chamber at a location below a level of heavier material in the first chamber when the apparatus is operating;
   a third chamber in fluid communication with the first chamber at a location above the level of heavier material in the first chamber when the apparatus is operating;
   a horizontally oriented annular pipe disposed in the first chamber below the level of heavier material in the first chamber when the apparatus is operating; and
   a plurality of ports disposed about the perimeter of the pipe, each port having a first end in fluid communication with the pipe and a second end through which mixture is discharged from the pipe into the first chamber, the discharge end of each port oriented at an angle of 18° to 24° above horizontal.

24. The apparatus of claim 23, wherein the discharge end of each port is oriented at an angle of 18° to 24° above horizontal and at an angle of 18° to 24° relative to a tangent line for the curve of the inside perimeter of the cylindrical panel.

25. The apparatus of claim 24, wherein the discharge end of each port is oriented at an angle of about 22° above horizontal and at an angle of about 22° relative to a tangent line for the curve of the inside perimeter of the cylindrical panel.

26. The apparatus of claim 23, wherein the discharge end of each port is oriented at an angle of about 22° above horizontal.

27. The apparatus of claim 23, wherein the discharge end of each port is the same distance from the cylindrical panel.

28. The apparatus of claim 23, wherein the discharge end of each port is 1" to 3" from the cylindrical panel.

29. The apparatus of claim 23, further comprising an ultrasonic transducer suspended at or near the center of the first chamber below the level of heavier material.

30. An apparatus for separating materials having different specific gravities, comprising:
   a vessel defined at least in part by a bottom and sidewalls extending up from the bottom;
   a first cylindrical panel inside the vessel;
   a first chamber bounded by an inside perimeter of the first panel;
   a second truncated cylindrical panel inside the vessel, the second panel partially surrounding and spaced radially out from the first panel and the second panel extending from the bottom of the vessel to a desired level of the heavier material;
   a divider plate extending radially from the first panel across each end of the second panel out to the vessel sidewall;
   a second chamber adjacent to part of the first chamber, the second chamber bounded by the first panel, the second panel and the divider plate;
   a third chamber adjacent to another part of the first chamber, the third chamber bounded by the vessel sidewall, the first panel, and the divider plate;
   the first panel configured so that heavier material can flow out under the first panel from the first chamber into the second chamber;
   the first panel configured so that lighter material can flow out over the first panel from the first chamber into the third chamber; and
   an annular pipe through which a mixture of materials having different specific gravities is carried into the first chamber, the pipe having an outside perimeter corresponding generally to the inside perimeter of the first panel and the pipe having a plurality of openings disposed along the outside perimeter through which mixture is discharged into the first chamber.

31. A method for separating materials having different specific gravities, comprising:

provide a cylindrical chamber;

discharging multiple streams of a mixture of materials having different specific gravities into the chamber at an angle of 18° to 24° above horizontal;

removing lighter material from the top of the circulating mixture; and removing heavier material from the bottom the circulating mixture.

32. The method of claim 31, wherein discharging comprises discharging multiple streams of the mixture into the chamber at an angle of 18° to 24° above horizontal and at an angle of 18° to 24° relative to a tangent line for the curve of baffle.

* * * * *